Figure 1:
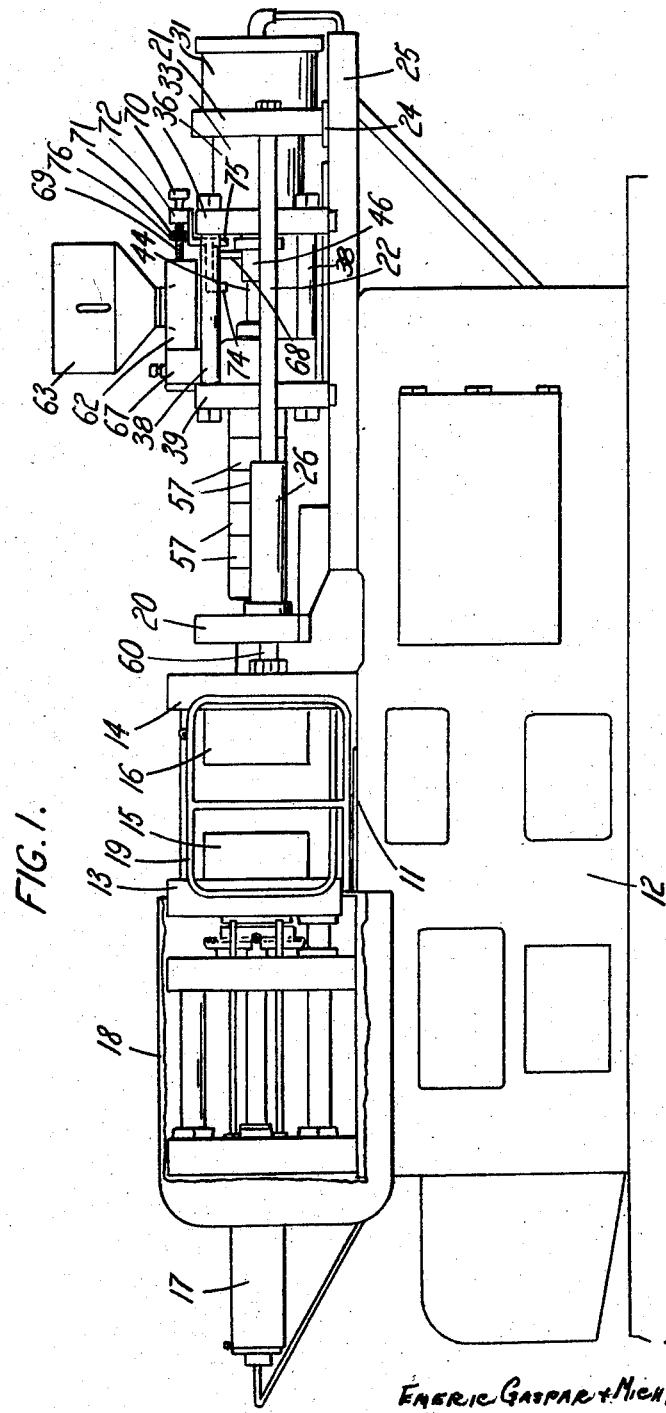

Dec. 1, 1959  E. GASPAR ET AL  2,914,804
INJECTION MOULDING APPARATUS
Original Filed June 27, 1955  4 Sheets-Sheet 1

INVENTORS:
EMERIC GASPAR + MICHAEL GEORGE MUNNS
By Watson, Cole, Grindle & Watson
Attorneys Dec. 1, 1959     E. GASPAR ET AL     2,914,804
INJECTION MOULDING APPARATUS
Original Filed June 27, 1955     4 Sheets-Sheet 2
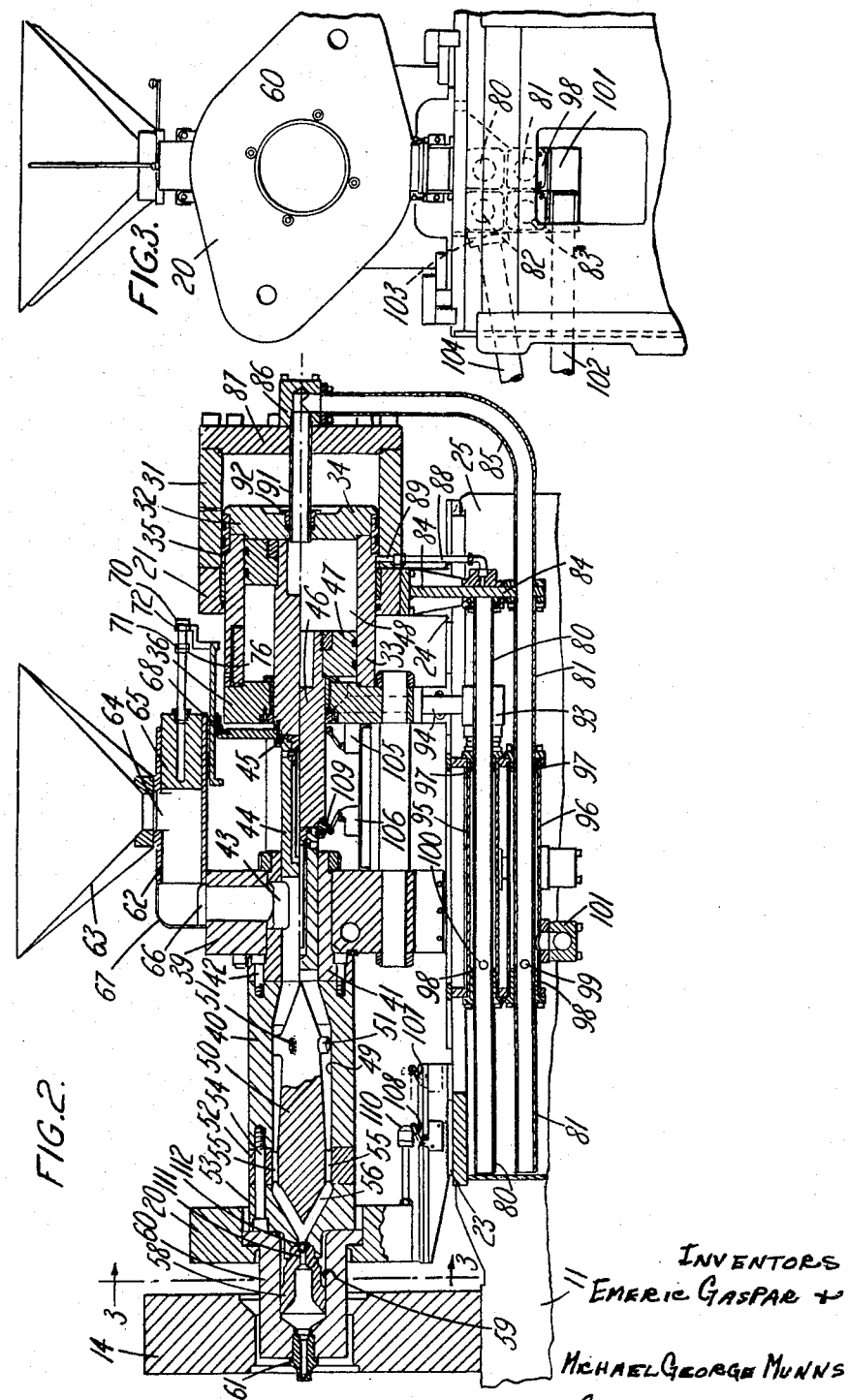
INVENTORS
EMERIC GASPAR &
MICHAEL GEORGE MUNNS
By Watson, Cole, Grindle & Watson
Attorneys Dec. 1, 1959  E. GASPAR ET AL  2,914,804
INJECTION MOULDING APPARATUS
Original Filed June 27, 1955  4 Sheets-Sheet 3

INVENTORS
EMERIC GASPAR & MICHAEL GEORGE MUNNS.
By Watson, Cole, Grindle & Watson
Attorneys Dec. 1, 1959 E. GASPAR ET AL 2,914,804
INJECTION MOULDING APPARATUS
Original Filed June 27, 1955 4 Sheets-Sheet 4

INVENTORS
EMERIC GASPAR AND MICHAEL GEORE MUNNS
By- Watson, Cole, Grindle & Watson
Attorneys

United States Patent Office 2,914,804
Patented Dec. 1, 1959

2,914,804

INJECTION MOULDING APPARATUS

Emeric Gaspar and Michael George Munns, London, England, assignors to The Projectile and Engineering Company Limited, London, England, a British company Continuation of application Serial No. 518,176, June 27, 1955. This application July 7, 1958, Serial No. 746,913

Claims priority, application Great Britain June 28, 1954

4 Claims. (Cl. 18—30)

This invention comprises improvements in or relating to injection moulding apparatus and is a continuation of our U.S. application Serial No. 518,176.

The present invention relates to the type of injection moulding apparatus which is known as the "Preplasticiser" type. In machines of this type the plastic material is introduced into a plasticising chamber from a feed device by a ram and is heated in the chamber and thence forced by ram pressure towards an injection nozzle, as is usual in injection moulding machines, but there is a transfer chamber which receives the plastic material from the plasticising chamber and keeps it hot, this chamber containing an additional ram which at the time of injection, is used to force the material through the injection nozzle. In known machines of this type, the plasticising chamber is formed on a branch from the conduit between the transfer chamber and a nozzle, which branch extends at an acute angle to the axis of the transfer chamber and nozzle and the pressure of the ram in the plasticising chamber produces a lateral stress which has to be allowed for in the design of the machine.

In co-pending U.S. application Serial No. 734,479 which is a continuation of No. 444,266 there are described injection moulding machines of the preplasticiser type wherein the transfer chamber is located in line between the plasticising chamber and the injection nozzle, the plasticising chamber is made axially movable and carries a ram at its front end which enters the transfer chamber, and the ram contains a passage for plastic material from the plasticising chamber to the transfer chamber.

The present invention relates to certain features of the said machines which provide a desirable disposition of the parts for effecting the movements required and also provides means whereby the transfer chamber with its injection nozzle can be retracted from the mouth of the mould and so caused to break the sprue of moulded material from the injection nozzle, where it enters the mould.

It will be appreciated that it is necessary to provide a feed ram to force material through the plasticising chamber and through the passage therefrom into the transfer chamber and that the thrust effected by this ram on the plasticising chamber is not necessarily identical with the thrust required to effect the forward movement of the transfer ram in the transfer chamber. Provision of a suitable assembly for effecting all the movements of the various parts which are coaxial with one another, in fact affords a problem in design.

The present invention contemplates a construction in which an injection unit is provided comprising a transfer chamber having an end wall, an injection plunger in the transfer chamber, these two parts containing an injection passage and a transfer passage each coaxial with the plunger and chamber, one passing through the plunger and the other through the end wall of the chamber, and a normally stationary injection nozzle in the part carrying the injection passage and communicating with the latter.

According to the invention there is a plasticising chamber which is coaxial with the injection unit, is secured to the part of the injection unit which contains the transfer passage and opens into said passage, in combination with a feed ram coaxial with the chambers and the plunger entering the back of the plasticising chamber, a movable head which carries the plasticising chamber, a main operating ram in line with the injection plunger and plasticising chamber and connected to said movable head, a main operating cylinder in the main operating ram, a feed cylinder within said main operating ram and a ram in said feed cylinder connected to and serving to operate the feed ram.

Figure 4:
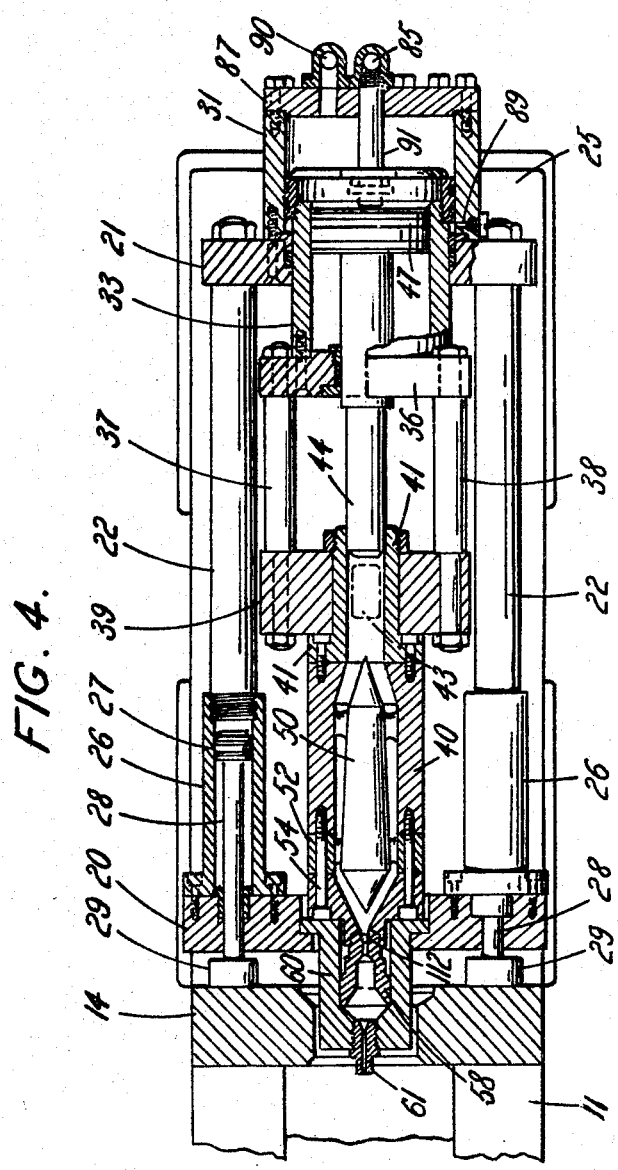
Figure 5:
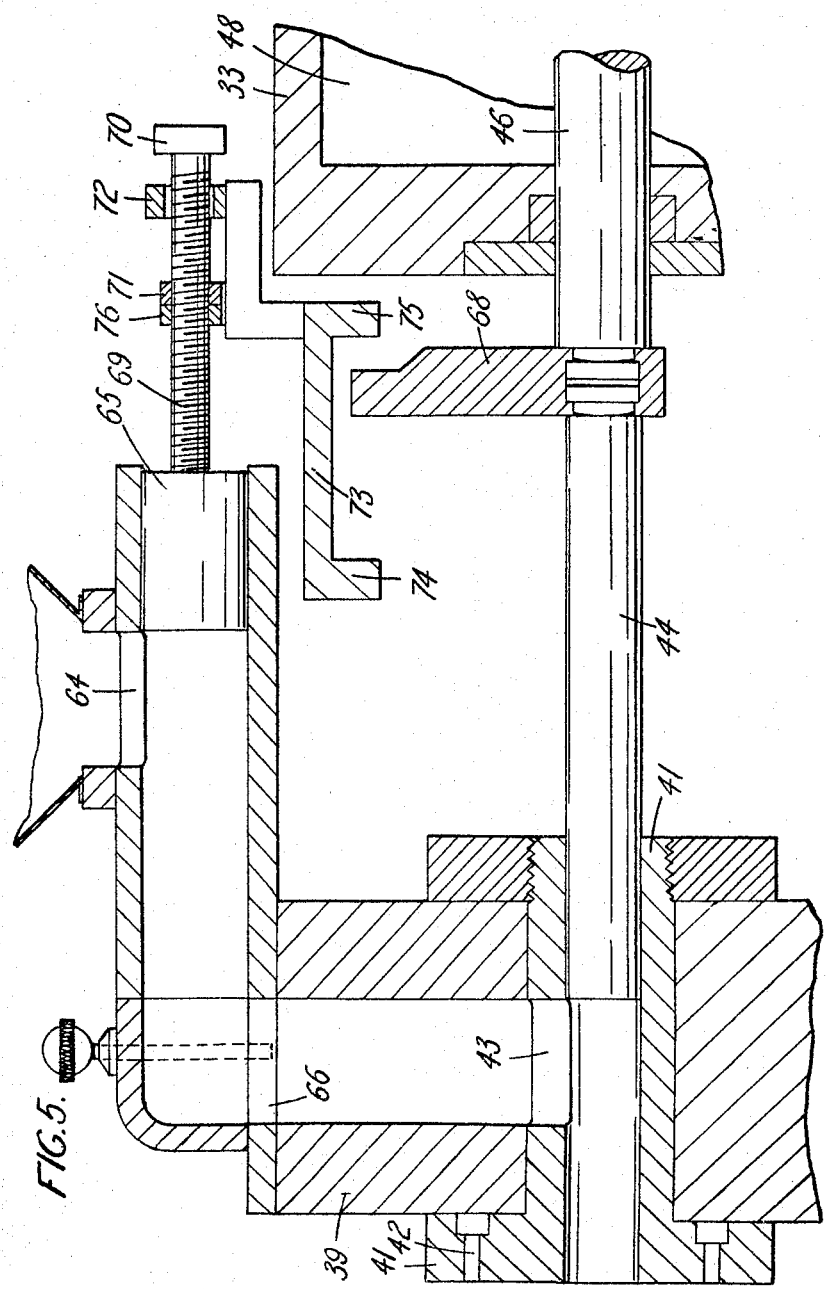

The following is a description by way of example of one construction in accordance with the invention, reference being made to the accompanying drawings, in which:

Figure 1 is a general front elevation of an injection moulding machine,

Figure 2 is a vertical section on the centre line of the machine of the parts which relate to the injection of the plastic material into the mould, Figure 3 is an end elevation of the parts shown in Figure 2 taken in approximately the plane 3—3 of Figure 2 looking in the direction of the arrows and with the bed of the machine shown in section, Figure 4 is a plan of the parts shown in Figure 2 with the main working parts shown in section, Figure 5 is a diagrammatic representation of the operation of the feeding device for plastic material.

Referring first to Figure 1, the machine comprises a bed 11, standing on a boxed-in base 12 and having guide surfaces on its upper face to support bolster plates 13, 14 between which run two halves 15, 16 of a mould. A hydraulic cylinder 17 is provided which is connected to the bolster plate 13 through an appropriate and well-known link-work (which is not shown in the drawing), to advance the bolster plate 13 towards the plate 14 and to grip the two half moulds between the two bolster plates with a pressure which is adequate to withstand the forces which occur during the moulding operation. A guard 18 protects the mechanism which connects the cylinder 17 to the bolster plate 13 and the guard supports a sliding gate 19 which when open prevents the two halves of the mould being closed.

All this apparatus is well-known in itself and the present invention relates to the injection mechanism which is shown in the drawing to the right of the bolster plate 14. This comprises two crossheads 20, 21 made of stout plate which are connected together by longitudinal frame bars 22 and are supported on shoes 23, 24 which are slidable on guideways in an extension 25 of the bed 11 behind the fixed bolster plate 14. The frame bars 22, which are best seen in the plan view, Figure 4, are spaced apart widely enough to accommodate between them the injection and feeding apparatus which is supported between the two crossheads 20, 21. Each of the frame bars 22 is made hollow at that end which is secured to the crosshead 20, and it constitutes at this portion a jack cylinder 26 which contains a piston 27 and ram 28. The ram 28 extends out of the jack cylinder through the crosshead 20 and is secured by a flange 29 to the bolster plate 14. The two jack cylinders 26 constitute push-off cylinders which are capable of moving the whole assembly of crossheads 20, 21, with the frame bars 22 and the parts supported thereby, away from the bolster plate 14, causing the shoes 23, 24 to slide along the guideways in the extension 25 of the bed. The assembly can in this way be moved away from the bolster plate and back again towards it, as required.

The rearmost crosshead 21 supports a main operating cylinder 31 which contains a main operating piston 32, secured to a large hollow ram 33. The main operating piston is double-acting, but it has a much larger area on its face 34 than on the side toward the ram 33 which latter face affords a narrow annular area 35 for effecting retraction of the ram 33. The ram 33 is secured to an auxiliary crosshead 36 and the crosshead 36 is connected by two longitudinally extending bolts 37, 38 to a further and stouter crosshead 39 which constitutes a feed-plate. The feed-plate 39 carries a plasticising chamber 40 which extends towards the crosshead 20. The plasticising chamber 40 has a feed-section 41 secured to it by screws 42 and the feed-section passes back through the feed-plate 39 and contains a feed-port 43 through which material to be plasticised can be fed into the chamber 40.

The extension 41 is bored out centrally to receive a feed ram 44 which is secured by a screw 45 to the front end of a feed-operating ram 46 which enters the interior of the main-operating ram 33 and is secured to a double-acting piston 47 therein. The interior of the main-operating ram 33 therefore constitutes a cylinder (48) for the piston 47 which may be called a feed-ram operating piston. The transfer ram 58 is threaded into the nozzle of the plasticizing chamber 40 and contains a connecting passage 111 between itself and the plasticizing chamber, within which there is a ball check valve 112, which allows material to pass from the plasticizing chamber to the transfer chamber, but not to return.

The plasticising chamber 40 in its body portion is of known form and is of cylindrical shape externally with a cylindrical hollow interior 49 which contains a cigar-shaped spreader 50 spaced from the walls 49 by streamlined radial projections 51. The spreader 50 has a flange 52 and is secured at its larger end to the plasticising chamber by bolting the flange 52 between the end of the cylindrical portion 40 of the chamber and a nose portion 53, the whole being secured together by screws 54. The flange 52 is provided with passages 55 in line with the annular space between the walls 49 of the plasticising chamber and the exterior of the spreader 50, which passages form a continuation of the annular space and lead plasticised moulding material into the nose portion 53 of the chamber where there is a conical annular space 56 in which the plasticised material is made to converge into a single central stream. The exterior of the plasticising chamber is wrapped about with electrical heating units 57 so that material which is being forced through the chamber will become heated in its passage and rendered plastic.

The front end of the nose portion 53 of the plasticising chamber carries a transfer ram 58 which works inside the bore 59 of a transfer chamber 60 secured to the crosshead 20 hereinafter referred to.

The transfer chamber 60 extends forwardly from the crosshead and partly through the fixed bolster plate 14 which is bored out to allow it to pass. It carries an injection nozzle 61 and when the assembly is slid forward by moving the shoes 23, 24 of the crossheads along the guideways, the injection nozzle makes contact with the half-mould 16 carried on the fixed bolster 14. This half-mould, which is not shown in Figures 2 and 3 of the drawing must, of course, contain an injection orifice which will register with the nozzle 61 in its forward position. The transfer chamber 60 also carries heating elements wrapped around it.

The means for feeding injection moulding material through the port 43 into the plasticising chamber 49 comprises a feed cylinder 62 which is secured on top of the feed plate 39 and carries a hopper 63 which communicates with the interior of the feed-cylinder 62 by a port 64. In the feed-cylinder 62 is a feed-drum 65 which is capable of reciprocation to and fro below the port 64. When it is retracted to the right as shown in Figures 2 and 5 of the drawings, material from the hopper 63 can fall down through the port 64 into the cylinder 62. When it is advanced by moving it to the left as shown in the drawing, it pushes the material which has fallen down in front of it along the cylinder 62 until it reaches a port 66 which allows it to fall down through the feed-plate 39 and port 43 into the rearward extension 41 of the plasticising chamber. A removable cover 67 is provided above the port 66 so that in the event of any clogging, the cover can be removed and access gained to the interior of the feed-cylinder 62 and the passage through the feed-plate 39. It will be appreciated that by contact with the heated plasticising chamber, the feed-plate 39 becomes heated and imparts some heat and tendency to softening in a preliminary way to the granular moulding material.

The ram 46 carries a striker 68 which moves to and fro with the ram in the space between the crosshead 36 and the feed-plate 39. The plunger 65 carries a screwed stem 69 on which is a head 70 and adjustable stop nuts 71 and 76. Sliding upon the screwed stem 69 is an intermediate feed member 72, which extends downwardly below the feed-cylinder 62 and rests upon the striker 68. Where it rests upon the striker 68 the intermediate feed member 72 has a horizontal saddle portion 73 which carries two downwardly projecting abutments 74, 75. The striker 68 works between the abutments 74, 75 and at each end of its stroke it moves the intermediate feed member 72 forward or back by a certain amount which is less than the stroke of the plunger 46 owing to the lost motion between the striker 68 and the abutments 74, 75. There is further lost motion between the intermediate feed member 72 and the screwed stem 69, which latter lost motion is adjustable by altering the position of the nuts 71 and 76. The latter can be locked by a lock nut 76. By this means the stroke imparted to the feed-ram 65 can be adjusted so that it will feed forward at each stroke an amount of material equal to that required for moulding one moulding in the mould 15, 16.

Below the guideways on the extension 25 of the bed there is an assembly of four telescopic feed-pipes 80, 81, 82, 83. Two of the pipes are shown in longitudinal section in Figure 2 of the drawing, and the four pipes are seen in dotted lines in Figure 3. The pipes 80, 81 are supported on a bracket 84 which is bolted to the underside of the cylinder 31. The pipe 81 is connected by a bent connecting pipe 85 to a fitting 86 on the end cover 87 of the cylinder 31. The pipe 80 is connected by a pipe 88 to a port 89 in the side of the cylinder 31 in front of the head 34 of the piston on the ram 33. Behind the pipe 81 as viewed in the drawing and horizontally in line with it is the pipe 83 which is connected by a pipe 90 (Figure 4) similar to the pipe 85 and in line with it as viewed in Figure 2 of the drawing, also to the fitting 86 on the cover 87. The pipe 90 through the fitting 86 delivers fluid under pressure to the interior of the cylinder 31 behind the head 32 and pressure so delivered can force the ram 33 forward. Pressure from the pipe 80 on the other hand retracts the ram 33. The pipe 85 is connected by the fitting 86 to a pipe 91 which is coaxial with the cylinder 31 and passes through a gland 92 in the head 34 so as to convey fluid under pressure to the interior of the hollow ram 33 behind the head 47 of the ram 46. The gland 92 permits sliding movement of the head 34 along the pipe 91, and the ram 46 is hollowed out to accommodate the pipe 91 when the head 32 and the ram 46 are both fully retracted.

The pipe 82 is connected by a fitting 93 and branch pipe 94 to the interior of the ram 33 in front of the head 47 of the ram 46, and pressure applied through this pipe will therefore retract the ram 46.

It will be observed that the four pipes 80, 81, 82, 83 all move backwards and forwards with the parts to which they are connected. In order to apply pressure to these pipes they slide telescopically through external supply tubes, two of which are shown in Figure 2 of the drawing at 95 (for the tube 80) and 96 (for the tube 81). The supply tubes have glands 97, 98 at their ends and the pipes 80, 81 have ports 99, 100 which are in communication with the interior of the supply tubes 95, 96 in all positions of the movement. The supply tubes 95, 96 carry fittings such as fittings 101 on the tube 96 in Figure 2 by which they may be supplied with hydraulic fluid under pressure, or alternatively connected to exhaust. The fitting 101 is shown in Figure 3 of the drawing connected to the supply pipe 102 and another fitting 103 is also shown in Figure 3 of the drawing on the pipe 82 connected to a supply pipe 104. The other pipes are similarly provided with fittings like the fitting 101. By this means all the movements of the ram 33 and the inner ram 46 can be separately controlled. The push-off jacks 26 are supplied with fluid under pressure by connections taken through the bolster plate 14, and the hollow interior of the ram 28.

Preferably, limit switches such as the switches 105, 106, 107, 108 shown in Figure 2 of the drawing are provided to co-operate with cam elements such as the elements 109, 110 and thus to complete electrical circuits at each end of the stroke of each of the parts. Such limit switches, if connected, to an appropriate control circuit in known manner, will serve to ensure that the parts can be operated automatically in a predetermined cycle, which may be further controlled by time switches so that once each mould cycle is commenced it will complete itself without further attention on the part of the operator.

Although one preferred construction of mechanism has been described with reference to the drawings, it is to be understood that this may be modified if desired in numerous ways. For example, instead of making the cylinder which operates the ram 44 so that it is formed in the interior of the main injection cylinder 31, it could be separate therefrom, and it is unnecessary for the push-off jacks to be located within the tie bars 22.

We claim:

1. In an injection moulding machine the combination of an injection unit comprising a transfer chamber having an end wall, an injection plunger in the transfer-chamber, these two parts containing an injection passage and a transfer passage each co-axial with the plunger and chamber, one passing through the plunger and the other through the end wall of the chamber, a normally stationary injection nozzle in the part carrying the injection passage and communicating with the latter, all said parts constituting the injection unit, a plasticising chamber coaxial with the injection unit, secured to the part of the injection unit which contains the transfer passage and opening thereinto, a feed ram coaxial with the chambers and plunger entering the back of the plasticising chamber, a movable head which carries the plasticising chamber, a main operating ram in line with the injection plunger and plasticising chamber and connected to said movable head, a main operating cylinder for the main operating ram, a feed cylinder within said main operating ram and a ram in said feed cylinder connected to and serving to operate the feed ram.

2. An injection moulding machine comprising the combination set forth in claim 1 wherein the main operating cylinder is rigidly connected by frame members to the part of the injection unit which carries the injection nozzle, and the whole assembly comprising plasticising chamber, feed ram, main operating ram and main operating cylinder with the part of the injection unit which carries the injection nozzle is made movable, a stationary mould-supporting bolster is provided having an opening through which the injection nozzle normally projects and push-off rams are provided between said assembly and the mould-supporting bolster.

3. An injection moulding machine as claimed in claim 2, wherein the main operating cylinder carries a cross-head, the part of the injection unit which carries the injection nozzle carries another cross-head, parallel frame-bars extend between said cross-heads and wherein the push-off rams are located within said frame bars.

4. An injection moulding machine comprising in combination a base, a mould supporting bolster upon said base, guideways upon the base behind the mould supporting bolster, an assembly slidable upon the base comprising two crossheads united by parallel frame-bars, push-off rams and an operating cylinder therefor mounted upon the frame-bars and engaging the bolster to move the cross-head assembly relatively thereto, a transfer chamber having an injection nozzle in the end, located in one of said cross-heads and entering an aperture through the bolster, a plasticising chamber in line with the transfer chamber and carrying a plunger to fit within the transfer chamber, a passage through said plunger between the plasticising chamber and the transfer chamber, a non-return valve therein, a feed-passage in the end of the plasticising chamber remote from the transfer chamber, a feed-ram in said passage means for feeding injection moulding material into said passage in front of said feed-ram, a main operating cylinder in line with the transfer chamber the plasticising chamber and the feed ram and secured to the cross-head which is remote from the bolster, a main operating ram in said main operating cylinder, struts connecting said main operating ram with the plasticising chamber, a feed cylinder formed in said main operating ram and a plunger in said feed cylinder operatively connected to the feed ram.

References Cited in the file of this patent

UNITED STATES PATENTS

| 2,309,496 | Bird et al. | Jan. 26, 1943 |
| 2,479,433 | Tucker | Aug. 16, 1949 |

FOREIGN PATENTS

| 551,468 | Great Britain | Feb. 24, 1943 |
| 635,991 | Great Britain | Apr. 19, 1950 |